US012521632B2

(12) United States Patent
Walker et al.

(10) Patent No.: US 12,521,632 B2
(45) Date of Patent: Jan. 13, 2026

(54) TRAVEL-DEPENDENT CONTENT PROVISION SYSTEM AND METHOD

(71) Applicant: Sony Interactive Entertainment Inc., Tokyo (JP)

(72) Inventors: Andrew William Walker, London (GB); Christopher William Henderson, London (GB); David Erwan Damien Uberti, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 221 days.

(21) Appl. No.: 18/170,202

(22) Filed: Feb. 16, 2023

(65) Prior Publication Data

US 2023/0277939 A1 Sep. 7, 2023

(30) Foreign Application Priority Data

Mar. 3, 2022 (GB) .................................... 2202953

(51) Int. Cl.

*A63F 13/60* (2014.01)
*A63F 13/216* (2014.01)

(Continued)

(52) U.S. Cl.

CPC ............ *A63F 13/60* (2014.09); *A63F 13/216* (2014.09); *A63F 13/332* (2014.09); *A63F 13/358* (2014.09); *A63F 13/47* (2014.09); *A63F 13/58* (2014.09); *A63F 13/65* (2014.09); *A63F 13/69* (2014.09); *A63F 13/77* (2014.09)

(58) Field of Classification Search

CPC .... A63F 13/216; A63F 13/332; A63F 13/358; A63F 13/47; A63F 13/58; A63F 13/60; A63F 13/65; A63F 13/69; A63F 13/77

See application file for complete search history.

(56) References Cited

U.S. PATENT DOCUMENTS 8,425,289 B2 * 4/2013 Beggs .................... A63F 13/53 463/43
9,858,832 B1 * 1/2018 Hsu-Hoffman ....... A63F 13/803

(Continued)

FOREIGN PATENT DOCUMENTS

EP 4238622 A1 9/2023
EP 4239292 A1 9/2023

(Continued)

OTHER PUBLICATIONS

Extended European Search Report for related EP Application No. 23156791.8, 15 pages, dated May 31, 2023.

(Continued)

*Primary Examiner* — William H McCulloch, Jr.
(74) *Attorney, Agent, or Firm* — Kilpatrick Townsend & Stockton LLP

(57) ABSTRACT

A system for presenting content to a user of a processing device during a journey, the system comprising a journey identification unit operable to identify one or more characteristics of the journey, a content determination unit operable to select and/or modify content in dependence upon the identified characteristics, and a content presentation unit operable to present the selected and/or modified content to the user of the processing device during the journey.

12 Claims, 4 Drawing Sheets

(51) Int. Cl.

| | |
|---|---|
| ***A63F 13/332*** | (2014.01) |
| ***A63F 13/358*** | (2014.01) |
| ***A63F 13/47*** | (2014.01) |
| ***A63F 13/58*** | (2014.01) |
| ***A63F 13/65*** | (2014.01) |
| ***A63F 13/69*** | (2014.01) |
| ***A63F 13/77*** | (2014.01) |

(56) References Cited

U.S. PATENT DOCUMENTS

| | | | | |
|---|---|---|---|---|
| 10,398,986 | B1 * | 9/2019 | Henroid | A63F 13/795 |
| 10,625,676 | B1 * | 4/2020 | Tsimhoni | G05D 1/0088 |
| 10,720,079 | B1 * | 7/2020 | Hsu-Hoffman | A63F 13/90 |
| 10,984,657 | B2 * | 4/2021 | Galang | G07C 5/0841 |
| 11,023,515 | B2 * | 6/2021 | Dazé | H04L 67/75 |
| 11,273,844 | B2 * | 3/2022 | Kassner | G09B 19/167 |
| 11,405,553 | B2 | 8/2022 | Naito | |
| 11,504,622 | B1 * | 11/2022 | Sanchez | A63F 13/216 |
| 11,571,622 | B2 * | 2/2023 | Mehdi | A63F 13/28 |
| 11,915,202 | B2 | 2/2024 | Nagata et al. | |
| 2002/0188390 | A1 | 12/2002 | Ichihara | |
| 2007/0066395 | A1 | 3/2007 | Harris | |
| 2008/0055311 | A1 * | 3/2008 | Aleksic | G06T 15/00 345/428 |
| 2009/0228199 | A1 | 9/2009 | Bhogal | |
| 2010/0287011 | A1 * | 11/2010 | Muchkaev | A63F 13/792 706/45 |
| 2011/0130852 | A1 | 6/2011 | Thorn | |
| 2012/0053805 | A1 * | 3/2012 | Dantu | B60W 40/09 701/70 |
| 2012/0215375 | A1 * | 8/2012 | Chang | B60W 50/14 701/1 |
| 2012/0221216 | A1 * | 8/2012 | Chauncey | B60W 40/09 701/1 |
| 2013/0316311 | A1 * | 11/2013 | England | G09B 19/167 434/65 |
| 2014/0129130 | A1 | 5/2014 | Kuramura | |
| 2014/0298169 | A1 | 10/2014 | Williams | |
| 2015/0046082 | A1 | 2/2015 | Okamoto | |
| 2015/0224400 | A1 | 8/2015 | Goslin | |
| 2015/0350835 | A1 | 12/2015 | Kuramura et al. | |
| 2016/0098339 | A1 * | 4/2016 | Masilamani | G06F 1/3212 702/186 |
| 2017/0122752 | A1 | 5/2017 | Feng | |
| 2018/0053433 | A1 * | 2/2018 | Dunn | G09B 7/00 |
| 2018/0311573 | A1 * | 11/2018 | Pickover | G16H 15/00 |
| 2018/0357233 | A1 * | 12/2018 | Dazé | H04L 67/561 |
| 2019/0228228 | A1 | 7/2019 | Tsukahara | |
| 2020/0011678 | A1 | 1/2020 | Patel | |
| 2020/0065842 | A1 | 2/2020 | Anirudh | |
| 2020/0184500 | A1 * | 6/2020 | Yuyama | B60W 40/09 |
| 2020/0309547 | A1 | 10/2020 | Davidsson | |
| 2021/0006717 | A1 | 1/2021 | Naito | |
| 2021/0286838 | A1 * | 9/2021 | Dazé | H04L 67/12 |
| 2021/0377696 | A1 * | 12/2021 | Hagland | H04L 67/52 |
| 2021/0389152 | A1 | 12/2021 | Beaurepaire | |
| 2022/0047951 | A1 * | 2/2022 | Mehdi | A63F 13/803 |
| 2022/0143498 | A1 * | 5/2022 | Åkerfeldt | A63F 13/352 |
| 2022/0185197 | A1 * | 6/2022 | Shimizu | B60R 11/02 |
| 2022/0188866 | A1 | 6/2022 | Farmer et al. | |
| 2022/0288495 | A1 * | 9/2022 | Endo | A63F 13/798 |
| 2022/0289197 | A1 * | 9/2022 | Endo | A63F 13/58 |
| 2022/0292886 | A1 * | 9/2022 | Endo | B60K 35/22 |
| 2023/0277939 | A1 * | 9/2023 | Walker | A63F 13/58 463/31 |
| 2023/0285862 | A1 * | 9/2023 | Walker | A63F 13/49 |
| 2025/0141816 | A1 * | 5/2025 | Nakfour | G06F 9/505 |

FOREIGN PATENT DOCUMENTS

| | | |
|---|---|---|
| JP | 202109249 A | 1/2021 |
| JP | 2021049249 A | 4/2021 |
| WO | 2017095852 | 6/2017 |

OTHER PUBLICATIONS

Combined Search and Examination Report for corresponding GB Application No. 2202953.2, 7 pages, dated Sep. 6, 2022.

Combined Search and Examination Report for related GB Application No. 2202956.5, 5 pages, dated Sep. 6, 2022.

Examination Report for corresponding GB Application No. 2202953.2, 4 pages, dated Jun. 18, 2024.

Extended European Search Report for corresponding EP Application No. 23155803.2, 8 pages, dated Jul. 7, 2023.

U.S. Appl. No. 18/172,392, "Non-Final Office Action", Jan. 7, 2025, 18 pages.

* cited by examiner

TRAVEL-DEPENDENT CONTENT PROVISION SYSTEM AND METHOD

BACKGROUND OF THE INVENTION

Field of the Invention

This disclosure relates to a travel-dependent content provision system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

With advances in technology over time the variety and quality of experiences available to a user of a device while travelling have increased substantially. This is due to a number of factors, which may include the availability of improved display technology, improved battery technology, increased processing power, increased storage capacity, and improved access to the internet. Further to this, increasing number of people make use of public transport or carpooling options to travel to work (for instance), thereby increasing the opportunities for device usage while travelling. In addition to these considerations, there is an increasing interest in self-driving vehicles—this may further provide opportunity for users of devices to use those devices while travelling.

Many people use their time while travelling to enjoy content such as videos, audio content, and video games. This can include the consumption of pre-downloaded content or streamed content, for example, or content which enables a user to interact with other users via a network connection (such as an online multiplayer game). This has led to innovations such as the provision of wireless networks providing internet access on vehicles such as trains and planes, further improving the ability of users to experience such content while travelling.

While this represents a convenient manner to consume content as it enables a user to do so when they would otherwise have little else to do, it is considered that there are a number of drawbacks associated with this. For instance, some journeys may include tunnels or the like which can interrupt a user's internet access and therefore interrupt their content experience. Similarly, in many cases the duration of the content does not align with the length of journey, causing a user to interrupt their content experience or otherwise forgo it so as to avoid the inconvenience of the interruption.

It is in the context of the above discussion that the present disclosure arises.

SUMMARY OF THE INVENTION

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
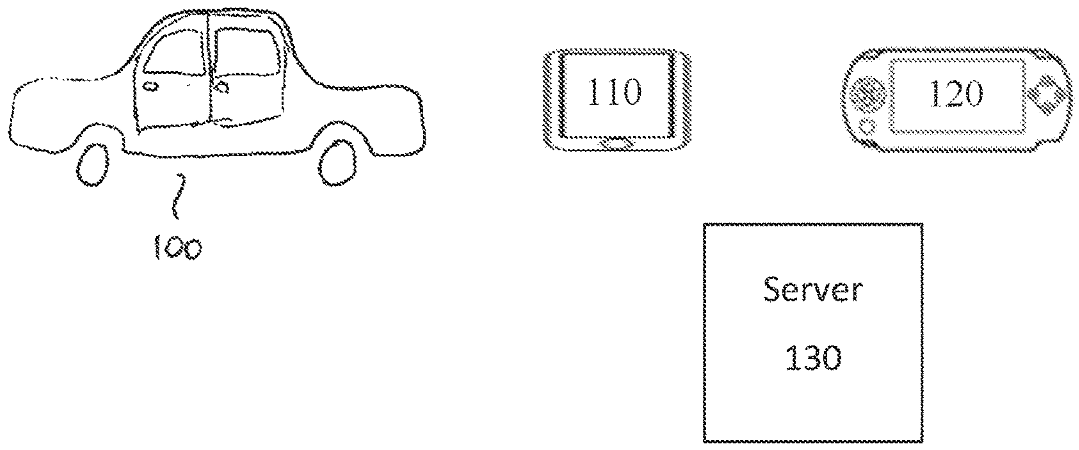
FIG. 1 schematically illustrates a system operable to implement one or more embodiments of the present disclosure.

Referring now to the drawings, wherein like reference numerals designate identical or corresponding parts throughout the several views, embodiments of the present disclosure are described.

Embodiments of the present disclosure offer arrangements in which a user can experience a more flexible content engagement experience during a journey; this is achieved through selecting or modifying one or more aspects of the journey and/or the content. The selection/modification of aspects of the journey may be determined based upon one or more characteristics of the content, and aspects of the content may be determined based upon one or more characteristics of the journey. Numerous technical advantages may be derived from embodiments of the present disclosure, examples of which are discussed below.

FIG. 1 schematically illustrates a system operable to implement one or more embodiments of the present disclosure; in practice, however, a number of additional devices may be provided and/or a number of those shown may be omitted where not required. In other words, the system may deviate from the example shown in FIG. 1 whilst still providing the same advantages. The units shown may be connected via any suitable method, such as wired or wireless connections. While shown as separate units here, in some embodiments a number of the devices may be provided in an integrated fashion.

A car 100 is shown as an example of a vehicle that may be used for the journey. The car 100 may comprise any suitable processing devices and/or navigation features; examples include in-car entertainment systems and satellite navigation systems. In some embodiments, the car 100 may be a self-driving car. Other vehicles may include trains or planes, for example, although any vehicle may be considered appropriate if it enables a user to consume content safely. The use of a vehicle is considered optional in embodiments of the present disclosure, as the journey may instead be undertaken by foot or other non-motorised transport (such as a bicycle).

A navigation system 110 is provided as a source of navigation information for the journey being undertaken, as well as the selection of a route by which the journey is to be taken. In some embodiments this may be integrated with the car 100 (or other vehicle), or may be a standalone device; alternatively, the functionality may be provided by another processing device (in some embodiments, the processing device 120) such as a mobile phone or games console.

The processing device 120 may be any device operable to provide content to a user. Examples include games consoles or computers, each of which may be portable or built into the vehicle. Further examples include mobile phones and head-mounted display units with on-board processing functions. In some embodiments, the processing capabilities of the device 120 may be somewhat limited, with processing instead being performed remotely in a cloud gaming arrangement or with limited capabilities being required for given functionality, such as video streaming. The processing device 120 may be integrated with the car 100 in some embodiments, as an example of an inbuilt in-vehicle entertainment system.

The server 130 represents one or more servers operable to perform various functions on behalf of any of the car 100, navigation system 110, and processing device 120. These functions may include navigation, the provision of route information (such as traffic or delay information), the execution of applications, provision of streaming content, or any other function related to providing content to the user or information about a journey.

In some embodiments the server 130 may facilitate communication between users of different processing devices 120, navigation systems 110 of different users, and/or between cars 100 (or other vehicles). This may be communication between devices of the same type or of different types—for instance, a games console associated with a first user may be operable to communicate with a navigation system of a second user so as to obtain information about their journey or route. In some embodiments, such as those in which multiple users are present in the same vehicle, such a server function may be unnecessary as information may be obtained via a local connection between devices.

While the discussion throughout this document is made with reference to travel by vehicles, it is also envisaged that the techniques disclosed may be implemented for journeys by foot or non-motorised vehicles such as bicycles. This may be of particular use in cases in which content is provided to the user in an augmented reality format, or otherwise using some form of see-through display that enables a user to see their environment while engaging with content.

Figure 2:
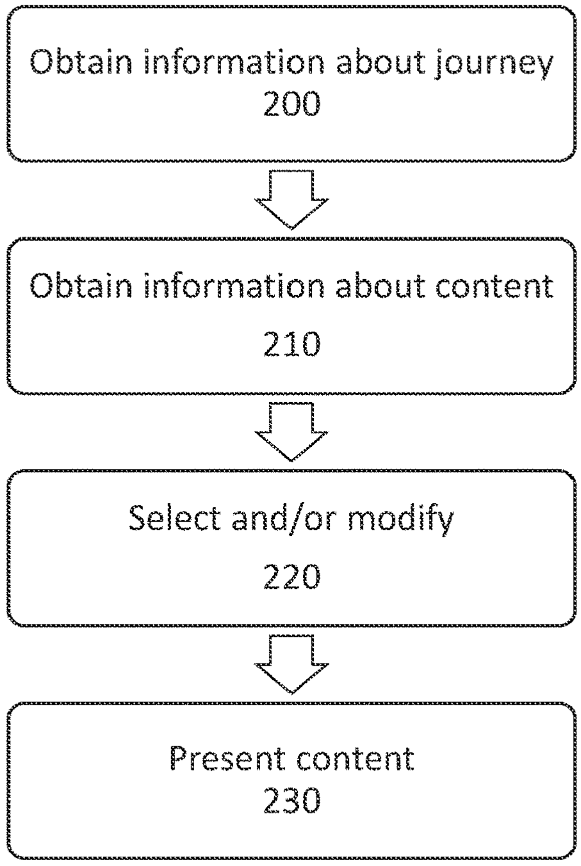
FIG. 2 schematically illustrates a method for providing content to a user during a journey in which there is a dependence between the journey and the content.

FIG. 2 schematically illustrates a general method for providing content to a user during a journey in which there is a dependence between the journey and the content. The journey may be undertaken using any transport means, such as cars, planes, trains, walking, or cycling. In some embodiments the user is expected to be a passenger of a vehicle, although in some cases the user may be the 'driver' of a self-driving vehicle.

A step 200 comprises obtaining information about the journey. This can include any information about the journey and/or a determined route for the journey as appropriate for a given implementation. While largely used interchangeably throughout this disclosure, in some cases 'journey' may refer to any travel from a start point to a particular destination while 'route' refers to the specific path that is taken (or otherwise considered) to complete a journey.

In some embodiments, the obtained information may include a start location and/or destination for the journey. Alternatively, or in addition, any one or more of an estimated journey duration, a time of day of the journey, number of users undertaking the journey, and an estimated brightness of the environment during the journey may be considered as examples of journey information. Examples of route information that may be obtained include information about congestion on a route, the availability of an internet connection on a route, areas where a user may need to pay attention to the road, time information for the route, variability of the time information for the route, and the fuel efficiency/usage for that route.

This information may be obtained from any suitable source—for instance, a user may input one or more details about the journey or route. Alternatively, or in addition, information may be obtained from a satellite navigation system (such as one built into a vehicle or provided by a user's mobile phone), or a server which stores navigation and/or traffic information, for example.

A step 210 comprises obtaining information about the content available to a user; in some cases, this may be limited to content that a user has expressed an interest in—for instance, narrowing the obtained information to being related to videos by channels the user has subscribed to rather than all videos on a streaming platform. The content may be any media content, including video (such as e-sports streams, movies, or television shows), audio (such as music or podcasts), or video games. The obtained information may relate to the duration of the content, for example, or information about whether a data connection is required. The duration of the content may refer to the length of time between the start and end of the content, or between any other pair of identified points. For instance, a user may revisit content and therefore not begin from the start (such as watching the second half of a movie, or loading a saved game state), and may continue consuming the content until a 'break point'. A break point may be any point that represents a suitable time to stop the content, such as a save point or checkpoint in a game, or a scene change in video content.

A step 220 comprises selecting and/or modifying one or both of a route for a journey and content to be presented to a user during that journey. In other words, step 220 comprises a selection/modification process performed for either or both of a route in dependence upon content to be presented, and content in dependence upon a route. Further discussion of these respective processes are described in more detail below. The performing of both of these processes in combination may be advantageous in that rather than make substantial changes to one of these processes, a smaller change can be made to each or a preferable outcome may be achieved.

For instance, if a route were forecast to take twenty-seven minutes then the user may be provided with content lasting twenty minutes if this is the longest available content with a duration below twenty-seven minutes. However, by extending the route to thirty-one minutes it would be possible to instead select content lasting thirty minutes as this would not be interrupted by the end of the journey. This may result in an improved journey for the user with a minimal impact to the journey time, as well as encouraging a user to take a longer route—such routes may be preferable to ease congestion on particular roads, or may offer improved fuel efficiency for example.

A step 230 comprises presenting the content to the user during the journey. This may be via any suitable device— these may include portable games consoles, laptops, mobile phones, head-mountable display units, in-vehicle entertainment systems, and tablet computers.

Figure 3:
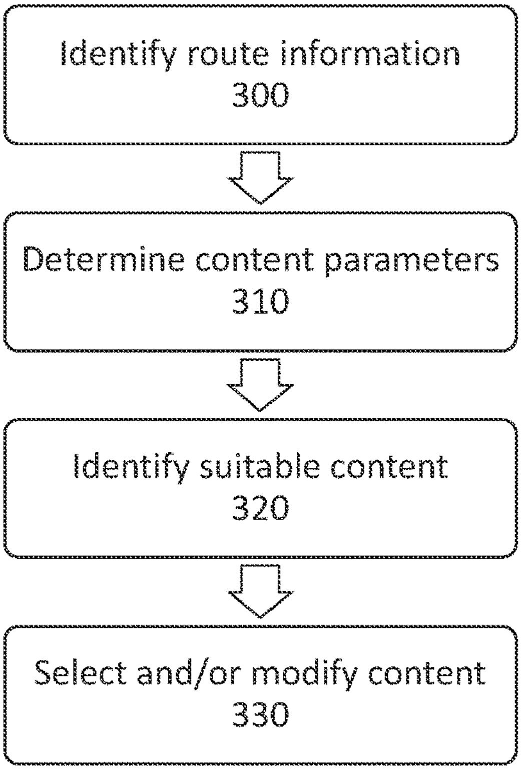
FIG. 3 schematically illustrates a method for selecting and/or modifying content in dependence upon an identified journey or route.

FIG. 3 schematically illustrates a method for selecting and/or modifying content in dependence upon an identified journey or route. Examples of parameters that may be considered as a part of this dependency include the available time to the user based upon an expected journey time, the network requirements of content and availability on a route, and estimated light levels throughout the journey.

A step 300 comprises identifying information about the route or journey being undertaken. This information may be identified based upon a user input and/or output from a navigation system, for example, and may be supplemented with additional information from a server or other data source (for instance, comprising traffic information). As noted above, this information may include a start location and/or destination for the journey. Alternatively, or in addition, any one or more of an estimated journey duration, a time of day of the journey, number of users undertaking the journey, and an estimated brightness of the environment during the journey may be considered as examples of journey information. Examples of route information that may be obtained include information about congestion on a route, the availability of an internet connection on a route, areas where a user may need to pay attention to the road, time information for the route, variability of the time information for the route, and the fuel efficiency/usage for that route.

A step 310 comprises determining one or more parameters for content in dependence upon the identified information. A number of examples of such parameters are provided below in isolation from one another, however it is of course envisaged that any combination of parameters (including those disclosed below and any other parameters that are able to be derived based upon the obtained information) may be considered alone or in combination as appropriate for a given implementation.

A first example of this is determining an amount of time available to the user in dependence upon the identified journey time. In addition to this, a determination of the amount of variability in the available time may be determined; this may be based upon a percentage of the journey time, for example, or may include information about expected or typical congestion that may be encountered. Further to either or both of these determinations, a determination may be made of whether the user is continuing to travel after reaching the destination—for instance, in a multi-stage journey, such as driving to the train station or an airport to then travel further. This may influence the content selection/modification as a user may be expected to continue with the content if they are to continue travelling (and so will only pause the content, rather than quit and revisit it another time). This determination can be based upon identification of the destination, user input, or information obtained from other sources (such as identifying that the user has booked tickets in advance).

A second example is that of determining whether content requiring a network connection (such as streamed video or online gaming) is appropriate for a given journey or route. This may be determined based upon access to maps of mobile phone signal or other network access, information about a mode of transport and whether that provides a data connection, or analysis of the geography being navigated as a part of the route—such as identifying tunnels or deep valleys that may be likely to have poor or no network connection.

A third example is that of determining light conditions for the journey so as to select content with an appropriate lighting level or the like. This may include a general brightness (for instance, based upon the time of day when the travelling occurs), for example, or a direction of the incident light (for instance, to determine likely glare on a device). The glare may be estimated based upon a time of day (and in some cases, year), a weather forecast, a location, and a travel direction as this enables the position of the sun in the sky relative to the user's orientation to be determined. While this may change based upon bends in a road, for example, this may be calculated for the overall direction of travel as this is likely to be representative of the most common relative orientation.

A step 320 comprises identifying content suitable for being provided to a user in dependence upon the parameters identified in step 310; in some embodiments however, it may be considered preferable to identify the available content without reference to the identified parameters (as these may be considered instead at the content selection/modification stage in some embodiments). This step may further consider information such as information about user preferences, access to content (such as paid subscriptions or owned content), and/or whether content is downloaded/installed. The identification may include the obtaining of any suitable information about that content—for instance, the duration of the content and/or the location of break points (such as save points, checkpoints, scene changes, or any other points at which it is otherwise suitable for a user to pause or exit the content).

The identification step 320 may comprise an analysis of content that may be provided to a user, such as installed (or otherwise accessible) games or available video streams; alternatively, such information may be available from pre-generated metadata or other associated data for that content which indicates one or more relevant characteristics (such as the location of break points or content duration). This analysis may be performed so as to identify checkpoints, save game opportunities, and areas of low/high intensity gameplay, for example, that are available within the content. This may be on the basis of the entire content, or on the basis of the content insofar as it can be experienced by the user in the identified available time. For instance, rather than identifying the location of all checkpoints in a game, only the location of checkpoints that can be encountered by the user within the available time may be identified.

The current game state for a videogame can be obtained from a save file created by that game, which is typically available on a local storage of the videogame apparatus, such as HDD 37. However, it is also commonplace for games associated with user accounts to have safe files mirrored to a remote server (so-called 'cloud saves'). Similarly, for streaming services where the games are run remotely and streamed to a client device, the game save may reside on the remote server. Hence the current game state for a given game may be available on a local videogame apparatus and/or a remote server. It will be appreciated that as long as the game state can be accessed, the precise location is not essential. Where a game has created multiple save files, then the most recent file, or a file identified as a 'current' or 'continue from here' save file (for example, a file created when exiting the game) may be used as the source for the current game state.

Typically, the game state of a game will identify for example some or all of: what level the user is currently on within the game, what save point the game was saved at (if fixed save points are used), the players in-game location, what levels are currently available to the user, what quests/challenges are currently available to the user, and the like.

This information may be extracted from a save file using information provided by the games developer or publisher (for example relating to the location of variables or descriptors for levels, open quests, save points and the like), or may be extracted from a data structure included within the save file that is specifically provided for the purposes of the present technique.

The analysis of the content may further comprise obtaining timing data for elapsed times between validated pairs of game states that includes an accessed current game state and a candidate next game state, the candidate game state being a game state which is considered suitable for a user to take a break (such as a checkpoint, or a period of low intensity within the game).

Examples of elapsed times between two game states include the time between two fixed save points, the time to begin and complete a quest, the time to engage and defeat a boss, the time to play a round of a multiplayer game in a particular play mode, the time to level up a character from their current level, the time to reach a key point within the game environment from their current position, and the like.

The timing data for these elapsed times may be obtained from a database, look up table or similar held locally and/or at a remote server. Hence for a given current state, one or more candidate next game states may be associated with it, together with a respective elapsed time. Only states that are associated in this way can be considered a validated pair of game states, for which timing data is obtainable. Hence a validated pair of game states may be considered to be a pair of game states with which timing data has been associated, typically in the form of progression from a first game state to a second game state.

It will be appreciated that a current state may comprise several different game state components that may separately be associated with respective candidate game state components. Hence for example in the role-playing game, the user may have unlocked several quests. Consequently, the time to complete each of these quests may be obtainable. Similarly, in a racing game where completion of the preceding race track unlocks the next race track, then the time to complete each unlocked racetrack, including the next race track, may be obtainable.

In some cases, the timing data for elapsed times between a validated pair of game states is provided by a provider of the respective game, such as for example the developer or publisher of the game. This data may be based upon the provider's experience or expectations, or may be empirically derived using one or more of the techniques described herein below.

Alternatively, or in addition, the timing data for elapsed times between a validated pair of game states is based on timing data collected from a subset of other players. Hence for example data may be obtained from play-testers used by the developer or publisher of the game, and/or may be obtained from conventional players of the game, who for example have progressed from the first player's current state to the candidate next state within a game.

The elapsed time taken for this subset of players to progress from one state to another is of course likely to vary considerably. To a first approximation, the timing data for the candidate next state may be the average of the elapsed times for this subset of other players.

However, given that the player is searching for activities due to a time constraint, it can be assumed that they are likely to play the game in a focused, goal driven and relatively rapid manner. As a result, to a second approximation the subset of other players comprises a subset of a predetermined percentage of other players having the fastest elapsed times. This serves to bias the average towards a faster gaming style, and may therefore bring the achievement of candidate next game states to within the target time. It also serves to avoid statistical outliers such as players who begin a game and then disengage for long periods, who might otherwise significantly skew the averages.

The predetermined percentage may be determined empirically to provide a bias that results in a realistic elapsed time. Hence for example if the average time for the fastest 50% of players is less than or equal to the target time, then this may provide an enjoyable and achievable activity for the first player, whereas if only the average time for the fastest 5% of players is less than or equal to the target time, then this is likely to be an unachievable activity for the first player, and may result in frustration. Consequently, typical values for the predetermined percentage of fastest other players may be 25%, 33%, 50%, 66%, or 75%, with higher percentages being more inclusive of players with less ability, but reducing the number of candidate next game states that will be less than or equal to the target time. Optionally the first player could specify an upper degree of difficulty that could be used to select a corresponding predetermined percentage, with a higher degree of difficulty corresponding to a smaller value for the predetermined percentage.

Alternatively, or in addition, the subset of other players may comprise a subset of other players having an elapsed time up to a predetermined multiple of the target time. Notably, unlike the previously described subset where the elapsed time is derived from the average times of other players, in this case the elapsed time is ultimately derived from the target time, because this is used to select the subset of other players.

Hence in this case the subset of players is those who achieved the candidate next state within a period of time similar to the first player's target time. The predetermined multiple is typically one of 1.0×, 1.1×, . . . 1.9×, 2.0×. Whilst a higher multiple may be considered, clearly the average of such a subset of players is more likely to be greater than the target time, making greater multiples unappealing. A typical multiple value is likely to be between 1.5× and 2.0×, typically resulting in an average close to the target time.

However, it will be appreciated that this subset of players is selected based on the first player's target time, rather than because they are necessarily representative of elapsed times for achieving the candidate next state. Hence optionally the subset is not included if represents less than a threshold percentage of all players having an elapsed time. This echoes the previous technique, where it was noted that for example if only 5% of other players achieve a given time, then the activity is unlikely to be achievable by the first player. Hence by requiring that a threshold percentage of all players have achieved the candidate next game state within the predetermined multiple of the target time, this provides a corresponding percentage chance that the first player can similarly achieve candidate next game state. For example, a threshold percentage may be 25%, 33%, 50%, 66%, or 75%, with higher percentages being more inclusive of players with less ability, but reducing the number of candidate next game states that will qualify.

The above discussion provides an example of a method by which the time to complete a portion of a game may be estimated, which can assist with determining which games (or portions of games) available to a user would satisfy the requirement imposed by the time available to a user before interruption.

A step 330 comprises selecting and/or modifying content to be provided to the user during the journey in dependence upon information about the route or journey. In some embodiments the selection may be omitted, as the user may select the content manually or content that was previously provided may be resumed. Alternatively, the content may be selected without consideration of the route/journey information and instead only the modification may be dependent upon this information. Similarly, it is noted that the modification of the content may not be performed in a number of embodiments—for instance, in cases where it is determined that it is not required as the content is already suitable based upon the route/journey information.

The selection of content may be performed so as to select content which can be expected to be completed or progressed between break points (such as checkpoints or save areas), or which is forecast to have a low-intensity portion at the expiration of the available time. The selection may also include the selection of parameters for the content in some cases, such as setting parameters that influence a game length. In the case that the content is video, the duration of the video or the location of suitable break points within the content (such as the location of advertisement breaks, or parts of the content identified as being low intensity) may be considered. These may be determined based upon an analysis of the content, or associated metadata which identifies such characteristics.

Here, intensity refers to the amount of 'action' that occurs in a given period—this can be defined in any suitable manner for a given content, and can be determined in a number of ways. For example, in some games the intensity may be determined based (at least in part) upon the number of enemies or their total strength, the user's remaining hit points, a travelling speed, or any other metric. A low intensity game portion may be one in which there are few (if any) enemies present, for instance, while a high intensity game portion may be one in which there are a larger number of enemies present.

In some embodiments, the selection may be performed in dependence upon how easily modified a game is, for example, and/or how well it is expected that a user would be able to make use of their available time; each of these are considered to be measures of how closely the content duration is likely to match the journey time (or be able to, if modified). The ease of modification of a game may be determined based upon any suitable criteria; in some cases, the ease may be defined by metadata associated with the game (or other data). For instance, a single player game may be considered easier to modify than a multiplayer game as this may generally lend itself more easily to modification due to not having to consider the impact of the modifications on other players. Similarly, game genres may be considered—a sports game may be considered less suitable than a role-playing game as the experience is more constrained in the sports game. For instance, a football game would not be well-received if the game were terminated at seventy minutes instead of the regulation ninety.

The ability of a user to make the most of their available time refers to the difference in time between a break point at which the user is expected to stop engaging and the amount of available time. For instance, if the user has twenty minutes available then it would be preferable if the suggested content lasted for eighteen minutes rather than ten (or had a break point at eighteen minutes rather than ten as the only break points before the twenty-minute mark) as this represents a more efficient use of the time available. In those cases in which a tolerance on the available time can be utilised, content may be suggested which most closely aligns a break point to the available time without considering whether the available time is exceeded—here, a tolerance may be a willingness of the user to continue playing a game or viewing content after the journey has ended.

Modification of the content may include any modification of the user's experience of the content in dependence upon the information about the route/journey. This may be performed in any suitable fashion—for instance, a games console may provide an input to a game indicating a desired gameplay experience (such as providing breaks at a particular time, optionally with a particular tolerance level on that time, the particular times corresponding to the end of the journey or breaks in that journey) and a game may tailor the content. Alternatively, the modification may be implemented at a system level with no interaction of the game—for instance, a games console may obtain information about the gameplay and generate a system level notification as a modification of the content.

In some embodiments, the modification is performed with consideration of the variance in the expected time for the user to complete the content—this may be particularly important for content which is not as rigid with its break points (such as sports games with a pre-defined duration). This may be implemented in the form of a buffer amount of time, for instance by determining modifications with the intention of making use of ninety percent (or any other suitable value based upon the degree of variance, tolerance on the available time, and/or the user's willingness to exceed the available time) of the available time so that the user is unlikely to exceed that time. Similarly, the modifications may be determined to as to include a period of low intensity which spans a period of time that corresponds to a percentage of that variance. For example, if a variance of two minutes either side of the estimated time is determined for a user to reach a break point, then the content may be modified such that for one minute either side of the break point would be a suitable break point (such as having a low intensity of gameplay).

A first example of such a method being implemented is that of tailoring a user's gameplay such that it will have a break point that coincides with the end of the user's available time (or at least occurs within a threshold amount of time of the end of available time). For instance, a user may select (or be presented with) a racing game to play. In such a case, the method may be operable to select or generate a race that would be expected to have a duration that falls within (or is roughly equal to) the available time. This may include selecting or generating a track having a particular expected lap time, determining a number of laps, and/or placing other conditions (such as a vehicle acceleration/top speed or the like) on the race such that the expected lap time multiplied by the number of laps leads to an expected race time that is suitable in view of the available time.

Of course, such an approach may be taken in any game genre—for instance, a score (or other) threshold may be defined for a level based upon a user's average performance (score per unit time, for instance) so as to provide an experience to the user that ends (or has a break) in a timely manner. For example, a sports game may have a half length selected to fit within the available time (to enable a full game or multiple games to be played), or a 'first to X goals' condition may be applied. Further constraints may also be applied, such as preventing games from going to extra time and limiting the amount of injury time or the like, so as to cause the gameplay to have a more consistent and predictable expected duration. In some embodiments one or more elements may be relocated or modified to assist with increasing or decreasing the time before a break—for instance, making an object easier or harder to find (size or colour changes, for example) can vary a quest length, or making goalposts bigger can lead to a faster end of the game when in a sudden death mode.

These are examples of generating (or selecting) content with an expected end time, with the expected end time being determined based upon any suitable characteristics. These characteristics may include any game state indicators (such as number of laps), as well as any user characteristics such as indicators of past performance.

A second example of such a method being implemented is that of tailoring a user's gameplay such that the game reduces in intensity at the end of the available time, or around that time (such as within a threshold amount of time of the end of the available time). This may be performed in a similar manner to the first example, albeit this second example is intended to illustrate a more dynamic approach to the time management.

When approaching the end of the available time, embodiments according to the second example are operable to modify the user's gameplay so as to reduce the intensity of the gameplay at an appropriate time. This is performed in advance of the end of the available time, although the amount of time in advance of this may be selected freely. Modifications can include any changes that lead to the end of the available time coinciding with a break in the content or a period of low intensity—reducing or stopping the spawning of enemies is an example of the latter, as is the transportation of a user to a new area within a game (such as a save/recharge area, or simply a new part of a map with fewer enemies).

For instance, in some cases a 'score attack' level may be terminated at the end of the expiry time—this can be implemented very close (such as a number seconds, such as ten seconds or fewer, remaining of the available time). Similarly, with a few minutes remaining a 'last goal wins' rule or the like may be implemented in a sports game—this can be implemented less closely to the end of the available time, such as a number of minutes, such as five minutes or fewer, remaining of the available time. A further example is that of selecting or generating a next stage while playing a game, or a portion of the map (such as a cave that can be explored) to not exceed the available time—this can be performed with any suitable timing, but may be most effective in the range of five to twenty minutes in advance of the available time (for instance). These timings and modifications are of course entirely exemplary, and the skilled person would be capable of implementing a method in which an appropriate time and modification can be utilised.

In a similar vein, modifications according to this example can also comprise an increasing of the intensity of a game where appropriate. For instance, if there is a lull in the intensity with a few minutes remaining of the user's available time then the intensity could be increased (for instance, by increasing the number of enemies) to enable the user to make the most of the final few minutes. Nearer to the end of the available time, the intensity could be lowered again.

A third example of such a method being implemented is that of controlling the content to display a notification to the user which indicates that they will not be able (or at least not likely) to reach the next break point before the end of the available time. This can be treated as an indication to the user that their current game state (or point in a video) is likely to be the last break point before the available time has elapsed. In some embodiments, a likelihood may be calculated and displayed that indicates to the user how likely they are to reach the next break point in the available time; this may be estimated based upon previous user performance and/or information about other users' progression, for instance.

In addition to this information, the user may be provided with an indication of the remaining available time to better inform their decision of whether to proceed. In some embodiments, the display of this notification may be accompanied by an auto-save of a game, and (if desired) an automatic termination of the content. This can be particularly useful for those who may have a hard time quitting a game, or when it is particularly important that the user supervise the other device (such as checking food is not burning).

The generation of such notifications requires information to be obtained about the content itself; this can be obtained via an analysis of the content (such as one in line with the above discussion), or via metadata or other data relating to the content. For instance, a user's performance may be tracked in a game to determine the average time between break points (such as save points or check points). Similarly, a game may have associated metadata that indicates timing information to assist with such a process. In some embodiments, it is sufficient to have information about game settings or a video duration rather than needing detailed information—for instance, if a user has a pre-defined half length in a sports game then this is sufficient information to determine whether the next game would finish before the available time expires.

While described above as separate examples, it is considered that an implementation of a method according to the present disclosure may also, or instead, use a modification that incorporates elements of any two or three of those examples (or indeed, other modifications). This may be particularly useful in a case in which a user progresses within a game more quickly or slowly than anticipated—this could be due to poor (or exceptional) performance, for instance, or due to pausing the game unexpectedly. This means that an initial generation of a stage to have a particular duration may not be fully successful, as it would overrun or fall short, and as such further modification may be required. Similarly, the notification example can be combined freely with the other examples as this represents an appropriate way to indicate to a user that the available time has almost fully elapsed, particularly if it is not clear to the user from the game state that this is the case (for instance, in the middle of a game stage).

The above examples relate to the modification of content in accordance with an available time of the user (the available time corresponding to the journey time); however as noted above the selection and/or modification may be performed in dependence upon other aspects of the journey.

In some embodiments, the network availability (or other predicted connection information) may be used as an input to the content modification process. While this information may more commonly be used for content selection, in some cases it may be possible to modify content such that offline portions (that is, portions of the content not requiring a network connection) may be timed to coincide with parts of a journey in which limited network access is available to the user. This may be achieved by obtaining content for presentation during those parts of a journey in advance, for instance, such as buffering video content or downloading game content sufficient to last the user until the network access is available again. This may be regarded as an adaptive buffering process, in which the buffering is based upon network availability during the journey.

Alternatively, or in addition, a game may be modified such that an offline area (that is, an area in which a user would not notice a lack of network connectivity) is encountered during the periods of limited network availability. Examples of offline areas may include a user's home area in an online multiplayer role-playing game, single player quest areas/games, and cut scenes which utilise locally available assets. The content may also be modified to provide a user with offline alternatives to gameplay, such as access to a character creation/modification function or reference or analysis content such as a walkthrough, gameplay statistics, locally-stored gameplay highlights, or tips and tricks.

Based upon information about network connectivity, the content may also be modified to more frequently save a game state so as to reduce the chance of losing a significant amount of progress due to varying network conditions. This may include local and/or cloud (server-based) storing of game state data. In some embodiments, the content may be modified so as to utilise local saving of game state information in preference to cloud saving so as to reduce the likelihood of data becoming corrupted due to a loss of network connectivity.

In embodiments in which content is selected based upon network availability, it may be the case that entirely offline content is selected if there are any (or at least significant, such as more than five or ten percent of the journey time) periods during which network connectivity is poor (based upon network speed or the quality of the connection, for instance) or non-existent. The phrase 'entirely offline' may mean a single player game or locally-stored video, for example, or the launching of a portion of the content that satisfies this condition (in other words, launching a part of a game that requires no online access such as a single player mode in preference to a multiplayer mode).

The estimated lighting conditions for a journey (or at least a portion of that journey) may also be used to modify content. For instance, the brightness of the content may be automatically adjusted so as to make the content easier for the user to see when the environment is expected to be bright or if glare is considered to be particularly likely. This can reduce the need for the provision of a camera or the like to detect current lighting conditions, thereby simplifying a technical arrangement. Similarly, content may be modified so as to cause a user to not encounter particularly light or dark environments as appropriate for given lighting levels. An example of this is that the content is modified to avoid a user visiting dark dungeons when travelling on a bright day or when glare is expected; similarly, the content may be modified to avoid a user visiting bright in-game environments when travelling at night.

Of course, rather that modifying content to satisfy these conditions content may simply be selected in accordance with them. For instance, information about a game's or video's colour palette or average brightness or the like may be referenced so as to select content appropriate for particular lighting conditions that are expected to be encountered by the user.

Content may also be selected so as to account for battery consumption of a portable device during a journey. Portable devices have a limited battery capacity and may not be able to be charged by a user during travel. It may therefore be advantageous to consider journey time when selecting content for presentation to a user throughout that journey. Different content may cause different amounts of power to be used over time—for instance, the streaming and display of high-resolution content (such as 4K video) may cause a higher drain on battery power than the display of locally-stored lower-resolution content (such as 1080p video). Similarly, a game which requires a lot of processing resources for execution may drain the battery faster than a simple game that requires fewer processing resources. The battery consumption for different content may be estimated in advance, or may be provided as metadata associated with the content, to assist with the selection of content.

Content may also be modified in accordance with this consideration, for instance to reduce the amount of processing resources being utilised. An example of this may be to cause a game to spawn fewer enemies, or to reduce the frame rate for rendering. These respectively cause a reduction in the number of in-game elements (thereby reducing the amount of processing required) and a reduction in the display quality (thereby reducing the rendering cost per frame of content).

The modification of content may include a modification of how saved data is handled. This may be particularly useful in multi-stage journeys in which a user changes processing device during the journey. For instance, a user may use a personal processing device (such as a games console) when travelling to an airport and then switching to using an integrated processing device on the plane. If the route identifies a multi-stage journey, it may therefore be considered advantageous that the game data or content progress (such as elapsed time in a video) is exported to either a remote server that can be accessed by each processing device to be used or to a removable storage medium that can be inserted into and read by each processing device. This export may be made automatic, and may otherwise not be performed if local storage is sufficient for a user's needs. In this manner, the save location of the content progress can be modified.

In some embodiments, the mode of transport associated with a particular route may also be considered when determining content to be selected or modifications to be applied. For instance, a user who travels via public transport may prefer to be presented with content that is more 'family friendly' or 'safe for work'; in other words, content that is not likely to offend other users of public transport. Content may therefore be selected to comply with this condition, or modified so as to remove or hide any potentially offensive content, for instance by bleeping bad language or overlaying black boxes on sensitive portions of images to be displayed.

In many embodiments, the selection and/or modification process may be applied in an iterative fashion rather than as a single step. In other words, new content may be selected or current content may be further modified throughout the journey. This can be advantageous in the case in which conditions change—for instance, if a user changes destination, unexpected congestion is encountered, a user is able to charge their device, network connectivity is unexpectedly lost, or the route is changed. In such embodiments the methods described, albeit in some cases the 'content to be presented' or the like may instead be read as the 'content being presented' if content is already being displayed to the user during the journey.

In some embodiments, this may be implemented such that an additional modification or selection is performed in response to a detection of a change in conditions (or at least a determination of whether a modification or selection is to be implemented is made in response to this). Alternatively, or in addition, a determination of whether a modification or selection should be performed may be made after a predetermined time has elapsed, or a predetermined portion of the journey (in terms of distance or elapsed time) is reached. For instance, the need for modification or a new selection may be determined every two minutes (as an example of a number of minutes as a suitable time interval, although any number may be selected) or after every five percent (or any other percentage interval) of the journey.

An additional step, not shown in the Figure, is that of presenting the selected/modified content to the user. This may be performed at the time of selection/modification, or at a later time when the method is performed prior to the start of the journey.

Figure 4:
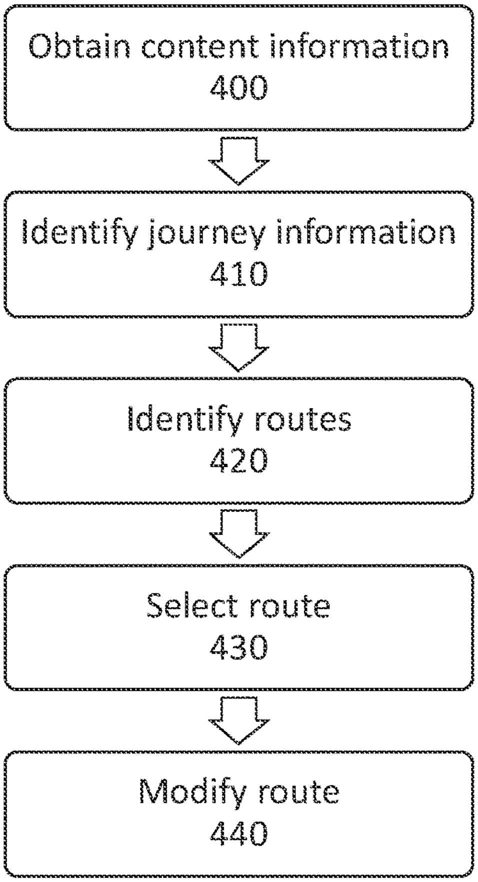
FIG. 4 schematically illustrates a method for selecting and/or modifying a route for a journey in dependence upon content to be presented during the journey.

FIG. 4 schematically illustrates a method for selecting and/or modifying a route for a journey in dependence upon content to be presented during the journey. Examples of parameters that may be considered as a part of this dependency include the duration of the content, the device power usage for that content, and network connectivity requirements for the content.

A step 400 comprises obtaining information about the content to be presented to the user. This may include any information about the content that is indicative of the suitability of a particular route for the display of that content. These may include a duration of the content, the location of break points within the content, the network connectivity requirements of the content, and/or the brightness of the content. This may be obtained from metadata associated with the content, for example, or information about previous plays of the content (by the particular user, or a larger cohort of users). Any suitable source of information may be utilised in this step, and the source may vary in dependence upon the content that is to be presented.

A step 410 comprises identifying information about the journey. This may include a start location and a destination, as well as one or more other locations that are to be visited on the route. Further information may include the mode of transport used by the user for the journey, as well as scheduling details such as a time at which the user needs to be at the destination (based upon an appointment time, for example) and the identity of other people that are travelling to the same destination (such as friends attending the same event). This information may be obtained in any suitable manner, such as from user inputs or from a user's calendar.

A step 420 comprises identifying information about one or more routes corresponding to the journey. This information may include duration, distance, fuel efficiency, network availability, and/or variability of characteristics of the route (such as the variance in the journey time due to congestion or the like). This information may be obtained from any suitable source, such as a navigation system, a travel service operator (such as a railway network operator), or information about a user's previous journeys.

A step 430 comprises selecting a route for the journey in dependence upon the identified information about the routes and content. The selected route may be selected in dependence upon any suitable parameters for the route, such as the optimisation of fuel efficiency, travel time, travel distance, similarity to the travel route of other users, network availability when required for the content, and/or the similarity between the content duration and journey duration. A number of these parameters may be considered in combination, such as a hierarchy of preferences or a weighted list of considerations, rather than selecting a single one.

For instance, in some embodiments the primary consideration may be selecting a route that corresponds most closely in duration to that of the content. If multiple routes offer a similar or the same correspondence, then they may be distinguished between based upon fuel efficiency or another parameter. This may not necessarily be the shortest route, as the content may have a duration that is longer than the shortest possible route. This may lead to a route being selected that is actually slower than the most direct route.

While this may appear to be disadvantageous to the user in some regards, it is clear that there is a benefit in enabling a user to enjoy their selected content without interruption. In addition to this, it is possible to derive a benefit to the traffic network as a whole. This is because in many cases congestion arises because particular roads are overloaded with vehicles; for instance, motorways can often have long tailbacks due to the sheer number of cars on the road. By selecting routes that are longer for those users who are happy to take their time (so as to enjoy their content without interruption), the load upon key roads can be reduced. The road network can therefore be utilised more efficiently without users being required to take longer routes unwillingly so as to enable the more direct routes to remain clear.

In some embodiments, the route may be selected in dependence upon a similarity with routes selected for other users. This may be to coordinate journey times, for example, or to enable a local data connection (such as an ad-hoc network for multiplayer gaming) to be maintained throughout a journey. Information about routes selected for other users may be obtained based upon a user input, for example, or through communication between route determining devices for each user (or the use of a centralised server for route selection). In some embodiments it is considered that the user's navigation application or device is associated with the user's gaming or content viewing profile so as to assist with location- or route-based interaction between users.

In some embodiments, a mode of transport may be identified as a part of the route selection—for instance, a user may be encouraged to take a walk or take a bus instead of using a taxi, despite the longer travel time, as this may match a content duration more closely. This may encourage users to user more environmentally-friendly transport options, as often the slower modes of transport are considered 'greener' relative to their faster alternatives. In such embodiments, the route options may include routes that correspond to a number of different transport options such as walking, cycling, taxi, train, plane, and driving.

An optional step 440 comprises modifying the selected route; this may be performed before beginning the journey and/or during the journey. In the former case, this may be advantageous in that a route that is otherwise a good option is improved further with respect to the content. For instance, when presented with a plurality of options in the selection step 430 the best option (such as the route with the duration closest to that of the content to be presented) is selected and then modified to improve the route with respect to one or more parameters (such as to more closely match the durations, or to avoid an area of poor network connectivity).

In the latter case, it may be advantageous to be able to modify the route in response to changing aspects of the route or the content. For instance, in some cases the amount of traffic may increase or decrease on a route which can cause the journey time to deviate from an expected journey time. This may mean that the journey is completed before the content, or that there is a significant amount of the journey remaining after the content has finished. Similarly, a user may progress through content at a different rate to that which was anticipated—for instance due to pausing content, or playing better or worse than expected. The user may also select new content, which has a different duration (and potentially other characteristics, such as network connections being required) to that of the remaining duration of the content prior to the change. The modification can then be performed to change the duration of the journey, or to otherwise provide desirable characteristics (such as network connectivity).

An additional step, not shown in the Figure, is that of presenting the content to the user while travelling using the selected/modified route. This may be performed at the time of selection/modification, or at a later time when the method is performed prior to the start of the journey.

Figure 5:
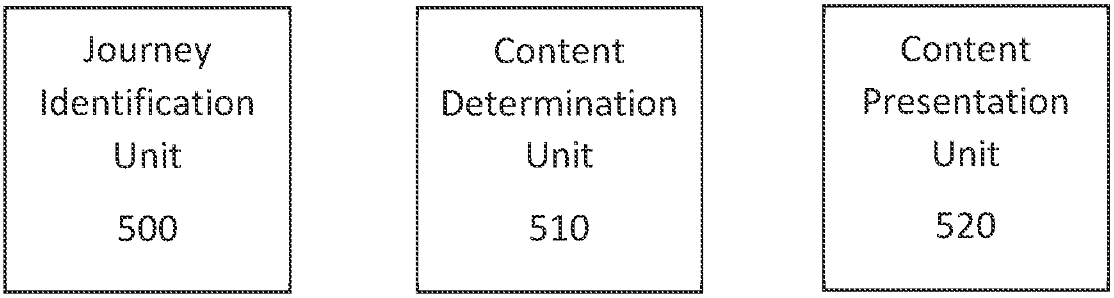
FIG. 5 schematically illustrates a system for presenting content to a user of a processing device during a journey.

FIG. 5 schematically illustrates a system for presenting content to a user of a processing device during a journey. The processing device may be a portable device or may be a processing device that is integrated into a vehicle. The system comprises a journey identification unit 500, a content determination unit 510, and a content presentation unit 520. This system may be embodied in a single device, such as a games console, or the functionality may be distributed amongst several devices as appropriate (such as games consoles, processing devices integrated into vehicles, mobile phones, and remote servers).

The journey identification unit 500 is operable to identify one or more characteristics of the journey. For example, the journey identification unit 500 may be operable to determine a journey time, the availability of a data connection throughout the journey, the time of day of the journey, and/or the journey distance. This may be derived from a navigation system or application, for instance, a remote data source (such as a travel service operator's web site) or may be derived from user inputs indicating one or more journey properties. In some cases the characteristics may relate more generally to the journey (such as a destination), while in others the characteristics may relate to a specific route that is selected for that journey (such as a duration, or network availability throughout a route).

The content determination unit 510 is operable to select and/or modify content in dependence upon the identified characteristics. While this may be performed in advance of the journey, in some embodiments the content determination unit 510 is operable to modify the content during the journey. In particular, it is considered that in some embodiments the content is video game content, and that the content determination unit 510 is operable to modify one or more parameters of the video game content during gameplay by the user. These parameters include one or more of a game intensity, a remaining duration of a game segment, an enemy spawn rate, the location of save areas or checkpoints, a game speed, and a game difficulty.

These parameter modifications may be performed so as to achieve a target duration of the gameplay experience of the user in dependence upon the time available to the user as determined based upon the journey time. In some embodiments, this target duration is determined as a duration that causes a suitable place for the user to take a break to coincide with the target duration (that is, the duration of the journey)—it is not required that the gameplay be terminated at this time. In other words, the target duration may be considered to be achieved if the gameplay provides a suitable stopping point for a user at a time corresponding to the target duration—independent of whether the user stops playing at that time. As discussed above, a 'suitable stopping point' is one in which there is a save point, checkpoint, low-difficulty gameplay, and/or low-intensity gameplay, for example.

In some embodiments the content determination unit 510 is operable to select and/or modify the content in dependence upon the time available to the user before the end of the journey; alternatively, or in addition, the content determination unit 510 may be operable to select and/or modify the content in dependence upon the availability of a network connection during the journey. A further alternative or additional operation of the content determination unit 510 is to select and/or modify content in dependence upon the journey time and the remaining battery power of the processing device—this can enable content to be selected that will not cause the battery power to be drained before the end of the journey.

In some embodiments, the content determination unit 510 is operable to obtain information one or more other processing devices associated with other users journeying to the same location, and to select and/or modify content in dependence upon this information. This information may correspond to the user's friends, for instance, with content being selected to enable a multi-user experience with those friends who are travelling to the same location. Similarly, information about the journeys of those other users can be used to determine whether the users are travelling via the same route—this can allow for the use of a local network connection for multiplayer gaming in preference to an internet connection, for instance, as the users are expected to remain in close proximity.

In many cases it is considered advantageous that the content determination unit 510 is operable to modify the content itself, however in some embodiments it may also considered advantageous if the content determination unit 510 is operable to select and/or modify one or more display properties of the content in dependence upon the identified characteristics. Display properties may refer to any properties which affect the appearance of the content without changing its content—for instance, a frame rate, colour palette, and/or resolution associated with the content. This may be performed to conserve battery power on a long journey, for example, or to reduce the amount of data being transmitted when streaming content if the route passes through areas with poor network connectivity. These modifications may be temporary, or may be implemented for the content for the entire journey.

The content presentation unit 520 is operable to present the selected and/or modified content to the user of the processing device during the journey. This may be performed using a display associated with the processing device, or in some embodiments the processing device may be operable to output the content to a display associated with a vehicle.

In some embodiments, a route modification unit operable to modify a route selected for the journey in dependence upon a selection and/or modification of the content may also be provided as a part of this system. The functionality of this unit may be provided in accordance with the discussion of the route determination unit of FIG. 6. By including such functionality, methods according to claim 2 in which both the route and content are selected/modified for a journey may be realised by the system.

The arrangement of FIG. 5 is an example of a processor (for example, a GPU and/or CPU located in a games console or any other computing device) that is operable to present content to a user of a processing device during a journey, and in particular is operable to: identify one or more characteristics of the journey; select and/or modify content in dependence upon the identified characteristics; and present the selected and/or modified content to the user of the processing device during the journey.

Figure 6:
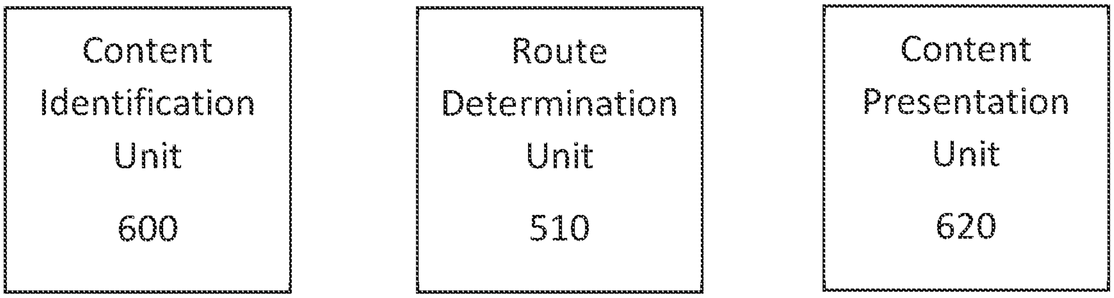
FIG. 6 schematically illustrates a system for determining a route for a user of a processing device during the presentation of content to the user.

FIG. 6 schematically illustrates a system for determining a route for a user of a processing device during the presentation of content to the user. The system comprises a content identification unit 600, a route determination unit 610, and a content presentation unit 620. These units may be embodied in any number of devices, rather than being limited to being implemented as a single device. In some embodiments at least the route determination unit 610 is embodied in a self-driving car.

The content identification unit 600 is operable to identify one or more characteristics of the content. The content identification unit 600 may be operable to identify one or more of a duration of the content, the location of break points in the content, and network connectivity requirements of the content; however, it is envisaged that any other characteristics of the content may be considered as appropriate for a given implementation.

The route determination unit 610 is operable to determine a route for a journey in dependence upon the identified characteristics, the start location of the journey, and the destination of the journey; alternatively, the route determination unit 610 may be operable to generate a number of candidate routes and to select from amongst these routes in dependence upon the identified characteristics. While in many cases the route selection may be performed in advance of the journey start, and the selected route is to be followed without change, in other cases it may be considered advantageous if the route determination unit 610 is operable to modify the determined route during the journey. The selection of a route may include both a selection of a path to be followed and a mode of transport, in some embodiments.

The route determination unit 610 may be operable to select a route having a duration that is approximately equal to the duration of the content. Here, 'approximately equal' can mean that the journey and the content have a similar duration, such as being within a threshold time of each other. This may be measured in absolute terms (such as a number of seconds or minutes) or relative terms (such as each having a duration that is at least a particular percentage of the other). For example, the durations may be required to be within thirty seconds of one another, or it may be required that the duration of one is between ninety-five and one-hundred percent of the duration of the other.

Rather than mapping the route selection to the end of the content, in some embodiments the route determination unit 610 is operable to select a route which results in the user reaching the destination during a break point in the content. The break point may be a save area, a scene change, or a low-intensity portion of a game that lends itself to a break in play, for example.

Rather than considering only the duration of the content, in some embodiments the route determination unit 610 may be operable to select a route which avoids locations with poor network connectivity if the characteristics of the content indicate the use of a network connection. This may be based upon a network coverage map, for example, information about the journey (such as information indicating that a train will go through tunnels), and/or information about the geography of a route to identify likely areas of poor network connectivity (for instance, by identifying valleys based upon contour lines on a map).

The route determination unit 610 may be operable to modify the determined route in response to changes in the content, changes in the expected progression of the content, and/or changes to one or more conditions on the route. Changes in the content may include the switching of content by the user, for instance, while changes in the expected progression may include accounting for the user pausing the content or playing in a fashion that causes their progression to be faster or slower than expected. Conditions on the route may include road closures, service delays, congestion, or any other event or factor that can change the duration of the journey.

In some embodiments, the route determination unit 610 is operable to select the most fuel-efficient route for the journey in dependence upon the duration of the content, or at least the most fuel-efficient amongst the route options that are considered suitable for a journey in dependence upon the content. The route determination unit 610 may also, or instead, be operable to select a route in dependence upon user preferences indicating a preferred maximum deviation from the shortest route. This can reduce the likelihood of selecting a route that is substantially longer or slower than the fastest or shortest route to enable the user to view content, as this would represent an inefficient journey (both in time and fuel).

The route determination unit 610 may be operable to select a route in dependence upon routes selected for users of other processing devices travelling to the same destination; this can enable users to be provided with the same (or substantially similar) routes or arrival times. This can lead to improved opportunities for multiplayer gameplay between those users, for instance, or at least a reduction in the time spent waiting at the destination for one another due to people selecting content of different lengths for the journey. As discussed above with reference to content selection, it is also considered that the route may be selected based upon the other users of the road (not necessarily those also viewing content or travelling to the same destination) so as to reduce the likelihood of particular roads becoming overburdened; this may be useful as the amount of congestion on the road network may be reduced.

The content presentation unit 620 is operable to present content to the user of the processing device during the journey, the journey being undertaken in accordance with the determined route. This may be performed using a display associated with the processing device, or in some embodiments the processing device may be operable to output the content to a display associated with a vehicle.

In some embodiments, the system may also comprise a content determination unit operable to select and/or modify the content to be presented in dependence upon a modification to the determined route. The functionality of this unit may be provided in accordance with the discussion of the content determination unit of FIG. 5. By including such functionality, methods according to claim 2 in which both the route and content are selected/modified for a journey may be realised by the system.

The arrangement of FIG. 6 is an example of a processor (for example, a GPU and/or CPU located in a games console or any other computing device) that is operable to determine a route for a user of a processing device during the presentation of content to the user, and in particular is operable to: identify one or more characteristics of the content; determine a route for a journey in dependence upon the identified characteristics, the start location of the journey, and the destination of the journey; and present content to the user of the processing device during the journey, the journey being undertaken in accordance with the determined route.

Figure 7:
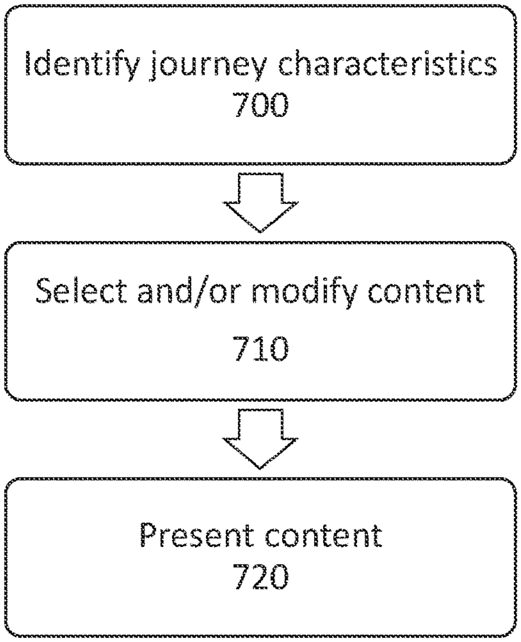
FIG. 7 schematically illustrates a method for presenting content to a user of a processing device during a journey.

FIG. 7 schematically illustrates a method for presenting content to a user of a processing device during a journey, the method comprising: A step 700 comprises identifying one or more characteristics of the journey. A step 710 comprises selecting and/or modifying content in dependence upon the identified characteristics. A step 720 comprises presenting the selected and/or modified content to the user of the processing device during the journey.

Figure 8:
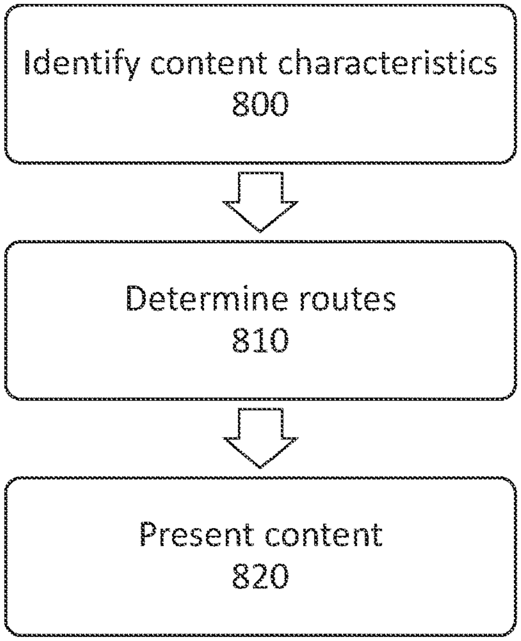
FIG. 8 schematically illustrates a method for determining a route for a user of a processing device during the presentation of content to the user.

FIG. 8 schematically illustrates a method for determining a route for a user of a processing device during the presentation of content to the user. A step 800 comprises identifying one or more characteristics of the content. A step 810 comprises determining a route for a journey in dependence upon the identified characteristics, the start location of the journey, and the destination of the journey. As noted above, this may include the generation of a plurality of different routes for the journey and a determination of which is the preferred route in dependence upon at least the characteristics of the content. A step 820 comprises presenting content to the user of the processing device during the journey, the journey being undertaken in accordance with the determined route.

As discussed with reference to FIG. 2, the methods of FIGS. 7 and 8 are considered to be compatible with one another and may be implemented in combination for managing both the content and the route for a particular journey.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be implemented in accordance with any one or more of the following numbered clauses:

1. A system for presenting content to a user of a processing device during a journey, the system comprising:
   a journey identification unit operable to identify one or more characteristics of the journey;
   a content determination unit operable to select and/or modify content in dependence upon the identified characteristics; and
   a content presentation unit operable to present the selected and/or modified content to the user of the processing device during the journey.
2. A system according to clause 1, wherein the journey identification unit is operable to determine a journey time, the availability of a data connection throughout the journey, the time of day of the journey, and/or the journey distance.
3. A system according to any preceding clause, wherein the content determination unit is operable to modify the content during the journey.
4. A system according to any preceding clause, wherein the content determination unit is operable to select and/or modify the content in dependence upon the time available to the user before the end of the journey.
5. A system according to any preceding clause, wherein the content is video game content, and wherein the content determination unit is operable to modify one or more parameters of the video game content during gameplay by the user.
6. A system according to clause 5, wherein the parameters include one or more of a game intensity, a remaining duration of a game segment, an enemy spawn rate, the location of save areas or checkpoints, a game speed, and a game difficulty.
7. A system according to any preceding clause, wherein the content determination unit is operable to select and/or modify the content in dependence upon the availability of a network connection during the journey.
8. A system according to any preceding clause, wherein the content determination unit is operable to obtain information one or more other processing devices associated with other users journeying to the same location, and to select and/or modify content in dependence upon this information.
9. A system according to any preceding clause, wherein the content determination unit is operable to select and/or modify content in dependence upon the journey time and the remaining battery power of the processing device.
10. A system according to any preceding clause, wherein the content determination unit is operable to select and/or modify one or more display properties of the content in dependence upon the identified characteristics.
11. A system according to any preceding clause, wherein the processing device is a portable device or is a processing device that is integrated into a vehicle.
12. A system according to any preceding clause, comprising a route modification unit operable to modify a route selected for the journey in dependence upon a selection and/or modification of the content.
13. A method for presenting content to a user of a processing device during a journey, the method comprising:
   identifying one or more characteristics of the journey;
   selecting and/or modifying content in dependence upon the identified characteristics; and
   presenting the selected and/or modified content to the user of the processing device during the journey.
14. Computer software which, when executed by a computer, causes the computer to carry out the method of clause 13.
15. A non-transitory machine-readable storage medium which stores computer software according to clause 14.

The invention claimed is:

1. A system for presenting content to a user of a processing device during a journey, the system comprising:

one or more processors; and one or more computer readable storage media storing instructions that, when executed by the one or more processors, cause the system to perform operations comprising:

identifying one or more characteristics of the journey, wherein identifying the one or more characteristics of the journey comprises determining at least one of a journey time, availability of a data connection throughout the journey, time of day of the journey, and journey distance;

selecting video game content in dependence upon the identified characteristics of the journey;

modifying the selected video game content to generate a tailored video game content, the tailored video game content being different from the selected video game content and tailored to the user and the identified characteristics of the journey; and presenting the tailored video game content to the user of the processing device during the journey.

2. The system of claim 1, wherein modifying the selected video game content includes further adjusting the tailored video game content during the journey if the identified characteristics of the journey changes during the journey.

3. The system of claim 1, wherein modifying the selected video game content includes adjusting the tailored video game content in dependence upon remaining time available to the user before the journey is terminated.

4. The system of claim 1, modifying wherein the selected video game content comprises generating the tailored video game content in accordance with past gameplay performance by the user.

5. The system of claim 1, wherein the modified video game content includes a modified parameter providing a different setting from the selected video game content in at least one of a game intensity, a remaining duration of a game segment, an enemy spawn rate, one or more locations of save areas or checkpoints, a game speed, and a game difficulty.

6. The system of claim 1, wherein modifying the selected video game content includes generating the modified video game content in dependence upon availability of a network connection during the journey such that the modified video game content includes at least one of buffered video content, offline area, offline alternatives to gameplay, and additional opportunities to save a game state in anticipation of a lack of network connectivity.

7. The system of claim 1, wherein selecting the video game content includes taking into consideration remaining journey time and battery power of the processing device.

8. The system of claim 1, wherein modifying the selected video game content includes modifying one or more display properties of the selected video game content at the processing device in dependence upon the identified characteristics of the journey.

9. The system of claim 1, wherein the processing device is at least one of a portable device and a processing device integrated into a vehicle.

10. The system of claim 1, wherein the operations further comprise modifying a route selected for the journey in dependence upon the tailored video game content.

11. A method for presenting content to a user of a processing device during a journey, the method comprising:

identifying, at the processing device, one or more characteristics of the journey, wherein identifying the one or more characteristics of the journey comprises determining at least one of a journey time, availability of a data connection throughout the journey, time of day of the journey, and journey distance;

selecting, at the processing device, video game content in dependence upon the identified characteristics of the journey;

modifying, at the processing device, the selected video game content to generate a tailored video game content, the tailored video game content being different from the selected video game content and tailored to the user and the identified characteristics of the journey; and presenting, at the processing device, the tailored video game content to the user of the processing device during the journey.

12. A non-transitory machine-readable storage medium which stores computer software which, when executed by a computer, causes the computer to perform a method for presenting content to a user of a processing device during a journey, the method comprising:

identifying one or more characteristics of the journey, wherein identifying the one or more characteristics of the journey comprises determining at least one of a journey time, availability of a data connection throughout the journey, time of day of the journey, and journey distance;

selecting video game content in dependence upon the identified characteristics of the journey;

modifying the selected video game content to generate a tailored video game content, the tailored video game content being different from the selected video game content and tailored to the user and the identified characteristics of the journey; and presenting the tailored video game content to the user of the processing device during the journey.

* * * * *